United States Patent Office 3,585,198
Patented June 15, 1971

3,585,198
HOMOPYRIMIDAZOLE DERIVATIVES, PROCESS FOR THE PREPARATION THEREOF AND PHARMACEUTICAL COMPOSITIONS CONTAINING SAME
Zoltan Meszaros, Jozsef Knoll, and Peter Szentmiklosi, Budapest, Hungary, assignors to Chinoin Gyogyszer es Vegyeszeti Termekek Gyara RT, Budapest, Hungary
No Drawing. Filed Nov. 1, 1967, Ser. No. 679,640
Claims priority, application Hungary, Nov. 2, 1966, CI–670
Int. Cl. C07d 51/48
U.S. Cl. 260—251         3 Claims

ABSTRACT OF THE DISCLOSURE

Analgesic and antipyretic 3-carbalkoxy or 3-carbethoxy-6,7,8,9 - tetrahydro-4H-pyrido [1,2a] pyrimidin-4-ones which also have a narcosis potentiating effect.

This invention is directed to heterocyclic compounds of therapeutical activity. More particularly it is concerned with new homopyrimidazole derivatives, process for the preparation thereof and pharmaceutical compositions containing same.

The first homopyrimidazole derivative (designated also as Pyrido(1,2a)-pyrimidine) and the nitro, ethyl and alkyl derivatives thereof have been prepared by reacting 2-amino-pyridine with malonic acid ester or with alkyl malonic acid ester and nitrating the product thus obtained [B.54, 814 (1921), B.57, 1168, (1924)]. It has been subsequently found [J. Am. Chem. Soc. 70, 3348 (1948)] that by the interaction of substituted 2-amino-pyridines and ethoxymethylene-malonic acid ester the ring closure may lead to different products, depending on the position of the substituents. Thus from 2-amino-pyridines substituted in positions 4 and 5 the homo-pyrimidazole-ring is formed, while if derivatives substituted in position 6 are used, the 1,8-naphthyridine-derivatives are obtained by yields of 90–95%. If certain substituents (4-Cl, 6-Br) are present, only tarry substances have been obtained.

The two reactions which take place are shown by the following reaction scheme:

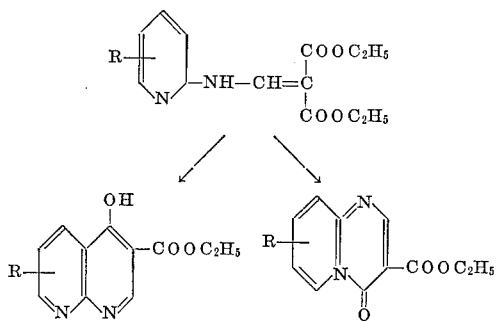

According to further publications [J. Org. Chem. 15, (1950) 377] 2-amino-pyridine has been reacted with malonic acid ester and it has been found again that if 2 - amino - pyridines substituted in position 6 are used (such as 6-amino-, 6-acetyl-amino, 6-ethoxy-derivatives), 1,8-naphthyridine derivatives are obtained. From the 6-methyl-derivative practically no useful product was obtained. In a further article [J. Chem. Soc. 74, 4905 and 5491 (1952)] the interaction of 2-amino-pyridine with acrylic acid ester, α-bromo-acrylic acid and ethoxy-methylene-malonic acid ester is described. Said reaction is carried out under reflux and at higher temperature. The hydrolysis of homopyrimidazole-esters under mild conditions is also described; whereby alsco the catalytic hydrogenation of oxocarbethoxy-homopyrimidazole is mentioned without disclosing any details.

According to a further article [J. Am. Chem. Soc. 74, 4910 and 5945 (1952)] the "malonyl-α-amino-pyridine" structure has been presumed and different chloro-derivatives of homopyrimidazoles prepared, namely the 2-chloro- and 2,4 - dichloro - derivatives of "malonyl - α-amino-pyridine" (the authors have presumed another structure). The phenyl - 2,4 - dione - homopyrimidazole (U.S. Pat. 2,698,846) has been prepared by reacting 2-amino-pyridine and α-phenyl-malonic acid ester at higher temperatures.

According to a further procedure [J. Am. Chem. Soc. 80, 3066–69 (1958)] a 2-amino-pyridine was reacted and no 1,8-naphthyridine derivative but a homopyrimidazole-ring was formed. 3,4- and 6-methyl-2-amino-pyrimidine were reacted with ethoxymethylene-acetoacetate and cyano-acetate, whereafter the 2-pyridyl-amino-methylene-acetoacetate and cyanoacetate respectively thus obtained were distilled in vacuo to yield homopyrimidazole derivatives comprising 9-methyl-, 8-methyl-, or 3-acetyl-, 3-cyano- and 4-oxo-substituents respectively. No experimental conditions were disclosed.

In addition to the aforesaid a number of publications are known relating to homopyrimidazole derivatives B.58 (1925) 352; Gaz. Chim. Ital. 67 327 (1937); J. Am. Chem. Soc. 70 3348 (1948); J. Chem. Soc. (1951) 551; Zsur. Obscsej. Him. 21 1145 (1951); Rec. Trav. Chim. 73 376 (1954); Proc. Ind. Acad. Sci. 42a 289 (1955) and 31 (1959); Arch. Pharm. 291/3 298 (1958); Org. Chem. 23 1358, (1958); German Pat. No. 1,171,928, Belgian Pat. No. 621,702./

The homopyrimidazole derivatives were used for photographical purposes as sensibilising agents (U.S. Pat. 3,072,485). For pharmacological utility only the 2-(2-dimethylamino - ethoxy) - 3 - (4-methoxy-benzyl)-4-oxo-homopyrimidazolehydrochloride was tested. It was found that said product makes histamine free and it influences the central nerval system [J. of Pharm. 54, vol. 6,888, (1965)].

According to a feature of the present invention there are provided new compounds of the general formula

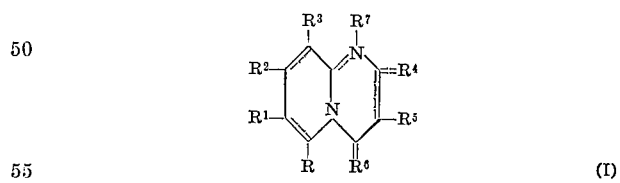

(I)

(wherein:

R is hydrogen, alkyl, alkoxy, halogen, nitro or amino;
$R^1$ is hydrogen, alkyl, alkoxy, halogen, nitro or amino;
$R^2$ is hydrogen, alkyl, halogen, alkoxy, nitro or amino;
$R^3$ is hydrogen, alkyl, halogen, alkoxy, nitro or amino;
$R^4$ is hydrogen, alkyl, aralkyl, aryl,=O, alkoxy, halogen or hydroxy;
$R^5$ is hydrogen, halogen, a $-CH_2-OH$ group, a carboxylic acid or a carboxylic acid derivative group;
$R^6$ is hydrogen, alkyl, aralkyl, aryl,=O, alkoxy, halogen or hydroxy;
$R^7$ is hydrogen, alkyl, aryl or aralkyl;

and the dotted lines represent optional double bonds) and salts and quaternary salts thereof.

The compounds of the Formula I exhibit narcosis potentiating, antipyretic and analgesic effect and may be therefore used in therapy. Certain derivatives were observed to have also a pain-blocking effect (algolytic effect). These compounds exert their effect in a hitherto unexplained way, without damaging the specific receptors.

The term "alkyl" as used herein means preferably such groups containing 1–5 carbon atoms, such as methyl, ethyl, isopropyl. The alkyl groups may be straight or branched-chained. As suitable representatives of the alkoxy groups there may be mentioned such radicals containing 1–5 carbon atoms, such as methoxy, ethoxy, isopropoxy.

The term "aralkyl" relates preferably to alkyl-radicals of 1–5 carbon atoms substituted by at least one aryl group (such as benzyl, phenethyl, etc.).

The term "aryl" as used herein means preferably the phenyl radical, which may be optionally substituted by one or more halogeno, nitro, amino, alkyl and/or alkoxy groups.

The term "halogen" encompasses all the four halogens, i.e. chlorine, bromine, iodine and fluorine.

The term "carboxylic acid derivative group" as used herein means preferably the following groups: —COO-alkyl, —CONH$_2$, —CONH-alkyl, —CON(alkyl)$_2$,

—CONHOH

—CH$_2$OH or —CH$_2$O-alkyl. The salts of the compounds of the Formula I may be formed with organic or inorganic acids. As suitable salts e.g. the hydrochlorides, sulfates, phosphates, formiates, oxalates, salicylates and tartrates may be mentioned.

The quarternary salts of the compounds of the Formula I may be those formed with lower alkyl halogenides, sulphates or nitrates. As suitable quaternary salts e.g. the methyl-bromides, methyl-iodides, methyl-chlorides, methyl-sulfates, methyl-nitrates and the corresponding ethyl-halogenides, ethyl-sulfates and ethyl-nitrates may be mentioned.

Particularly useful compounds of the Formula I are the following derivatives:

3-carbethoxy-4-oxo-6-methyl-4H-pyrido[1,2a]pyrimidines and salts quaternary salts thereof.
3 - carbethoxy - 4 - oxo-6-methyl-6,7,8,9-tetrahydro-4H-pyrido[1,2a]pyrimidine and salts and quaternary salts thereof.
4-ethoxy - 6 - methyl-6,7,8,9-tetrahydro-4H-pyrido[1,2a]pyrimidine - 3 - carboxylate and salts and quaternary salts thereof.
4 - oxo - 6 - methyl-6,7,8,9-tetrahydro-4H-pyrido[1,2a]pyrimidine-3-carboxylic acid amide and salts and quatenary salts thereof.
3 - carboxy - 4 - oxo-6-methyl - 6,7,8,9-tetrahydro-4H-pyrido[1,2a]pyrimidine and salts and quaternary salts thereof.
2,6-dimethyl - 4 - oxo - 4H - pyrido[1,2a]pyrimidine and salts and quaternary salts thereof.
2,6 - dimethyl-4-oxo - 6,7,8,9-tetrahydro-4H-pyrido[1,2a]pyrimidine and salts and quaternary salts thereof.
4-hydroxy - 6 - methyl-6,7,8,9-tetrahydro - 4H - pyrido[1,2a]pyrimidine-3-carboxylic acid amide.
3 - carboxy - 4 - oxo-6-methyl-4H-pyrido[1,2a]pyrimidine and salts and quaternary salts thereof.
4-oxo-6-methyl - 6,7,8,9-tetrahydro - 4H - pyrido[1,2a]pyrimidine and salts and quaternary salts thereof.
4-hydroxy - 6 - methyl-6,7,8,9-tetrahydro-4H-pyrido[1,2a]pyrimidine and salts and quaternary salts thereof.
4-oxo - 6 - methyl-6,7,8,9-tetrahydro - 4H - pyrido[1,2a]pyrimidine-3-hydroxamic acid and salts and quaternary salts thereof.

According to a further feature of the present invention there is provided a process for the preparation of the compounds of the Formula I which comprises reacting an amino-pyridine derivative of the general formula.

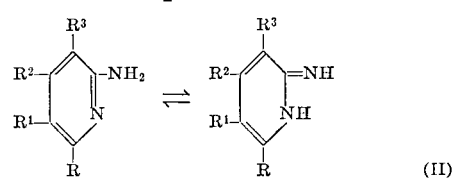

(wherein the substituents R, R$^1$, R$^2$ and R$^3$ have the same meaning as stated above) with a compound of the general formula

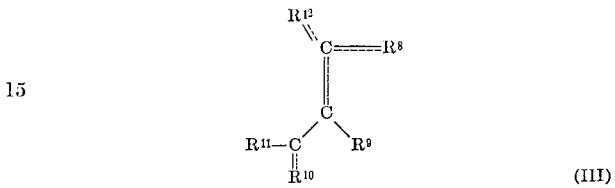

(wherein:

R$^8$ is hydrogen, alkyl, aralky, aryl, =O, alkoxy, halogen or hydroxy;
R$^9$ is hydrogen, alkyl, aralkyl, aryl, halogen, a carboxylic acid radical or a carboxylic acid derivative radical;
R$^{10}$ is hydrogen, alkyl, aralkyl, aryl, =O, alkoxy, halogen or hydroxy;
R$^{11}$ is alkoxy, =O, hydroxy, hydrogen or halogen;
R$^{12}$ is alkoxy, =O, hydroxy, hydrogen or halogen) and cyclising the condensation product thus obtained optionally after isolation in the presence of phosphoric acid and an acidic condensing agent, whereby compounds of the general formula

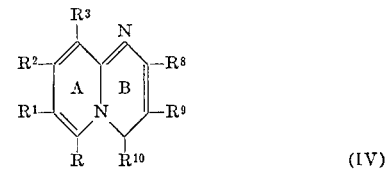

or salts thereof are formed (in which formula the substituents R–R$^{10}$ have the same meaning as stated above) and if desired converting the compounds thus obtained into their salts, or setting the bases free from their salts or converting a salt into another salt and/or if desired reducing a compound thus obtained or introducing the substituents R$^4$, R$^5$, R$^6$ and/or R$^7$ into the molecule by methods known per se.

As acidic condensing agents preferably phosphorous oxychloride, phosphorous trichloride, thionyl chloride and/or hydrochloric acid may be used.

Particularly suitable representatives of the compounds of the Formula III are the following compounds: malonic acid, acetoacetic acid, benzyl acetic acid, propionic acid, acrylic acid and the derivatives thereof. Substituted derivatives may be used as well. In the place of the free carboxylic acids the esters, halogenides, anhydrides or amides thereof may be used too.

The compounds of the Formula IV may be optionally hydrogenated in the presence of a catalyst. This step may also be carried out by converting the substituents R$^8$, R$^9$ and/or R$^{10}$ previously into the desired groups. Similarly the R$^7$ substituent may be introduced also previously into the molecule. The known hydrogenating catalysts may be used for this purpose. When hydrogenation is accomplished in the presence of palladium, the A-ring may be completely saturated and tetrahydro-homopyrimidazole derivatives are obtained.

Hydrogenation may be carried out preferably in the presence of anhydrous or aqueous ethanol, water propanol, isopropanol or chloroform as solvent or diluent. The reaction may be effected at room temperature or a temperature not exceeding 75° C. and at atmospheric pressure or at pressures in the range of 2–11 atm.

The substituents $R^8$, $R^9$ and $R^{10}$ in the compounds of the general Formula IV may be transformed into the desired groups by methods known per se.

The =O groups of the compounds of the Formula IV and derivatives thereof saturated in ring A may be converted into —OH or —O—alkyl groups by reducing same with complex metal hydrides, preferably with an alkalimetal borohydride or lithium aluminium hydride.

If the substituents $R^8$ and $R^{10}$ respectively represent hydroxy groups, chlorine atoms may be introduced into the molecule by reaction with phosphorous oxychloride or thionyl chloride or an other known chlorinating agent. Said reaction may take place both on the saturated and unsaturated rings. The chlorine atom may be removed by hydrogenation and replaced by alkoxy or phenoxy groups by means of interaction of the chlorine-derivative and alcoholates or phenolates respectively.

When $R^8$ and $R^{10}$ are not keto-groups, the molecule may be hydrogenated further in the presence of a palladium catalyst to yield octahydro derivatives.

The nitrogen atom in position 1 of the B-ring may be optionally substituted. For this purpose the unsaturated or partly or completely saturated molecule is reacted with a reactant capable to introduce an alkyl or aralkyl group into the molecule. This step may also be carried out when the modifications of the other substituents have already been accomplished. Said reaction may be carried out by using e.g. alkyl halogenides or aralkyl halogenides. The interaction may be accomplished preferably in the presence of an acid-binding agent.

If the halogeno-groups are to be subjected to further chemical reactions, one may proceed by removing the halogen atoms by reduction (advantageously with hydrogen) or by reacting the halogeno-derivatives with alcoholates, whereby alkoxy groups are formed in the molecule. On interaction with phenolates the aryloxy derivatives are obtained. The amino group may be introduced by reacting the halogeno-derivatives with ammonia or alkali metal amides. The amino derivatives may be diazotized and hydrolysed to yield the corresponding hydroxy derivatives. The amino group may be replaced by hydrogen atom by reducing the diazonium-compound. A halogen atom different than that originally present may be introduced by means of Sandmeyer-reaction.

The unsubstituted derivatives may be converted into halogeno-derivatives by treating same with halogenating agents (e.g. bromine).

On hydrolysing compounds of the Formula IV wherein $R^9$ represents a carboxylic acid ester radical, the free acids or salts thereof may be obtained. The acid amides may be obtained by reaction with ammonia, while the N-substituted acid amides may be prepared by treatment with alkyl amines. Reduction carried out with complex metal hydrides—preferably with alkaline earth metal borohydrides—provides products containing the hydroxymethyl radical.

If saturated compounds of the Formula IV—in which $R^9$ stands for a carboxylic acid ester group and $R^{10}$ is oxygen—are treated with sodium borohydride, simultaneously with the reduction of the ketone-group in one step also an intramolecular ethylation takes place to yield the free acids in which the ox-group is replaced by the ethoxy radical.

The compounds of the Formula I may be converted into acid addition salts formed with organic or inorganic acids. Salt-formation may be carried out according to usual methods and it is preferred to use hydrochloric acid, sulfuric acid, phosphoric acid, formic acid, oxalic acid, tartaric acid or salycilic acid for this purpose.

The compounds of the Formula I may be converted into quaternary salts. It is preferred to use by the formation of the quaternary salts methyl chloride, methyl bromide, methyl iodide, methyl sulphate, methyl nitrate or the corresponding ethyl halogenides, ethyl sulfate or ethyl nitrate.

The basis of the present invention resides in the recognition that 2-amino-pyridine-derivatives substituted in position 6 may be converted under specific reaction conditions into the corresponding homopyrimidazole derivatives substituted in position 6 with almost quantitative yields. This is contrary to the earlier statements disclosed in prior art. The process of the present invention provides on the one hand partly new compounds and on the other a new method for the formation of the 4H-pyrido[1,2a]-pyrimidine ring-system.

The ring-closure of the present invention is carried out in the presence of an acidic condensing agent and phosphoric acid. It has been found in a surprising way that an acidic condensing agent in itself is not sufficient. Thus if the reaction is carried out in the presence of phosphorous oxychloride alone, practically no ring-closure takes place. At least a minimal amount of phosphoric acid must be present. In order to provide almost quantitative yields about ⅔ mole of phosphoric acid must be present calculated on 1 mole of the reactant. It is preferred to carry out the reaction in the presence of polyphosphoric acid. In the place of polyphosphoric acid also phosphoric acid, phosphorous pentoxide or mixtures thereof may be used.

On carrying out the process the reaction mixture is diluted with a lower alcohol (such as methanol, isopropanol, butanol) after ring-closure. It is preferred to use ethanol, whereby the excess of phosphorus oxychloride is decomposed. On standing or cooling the product precipitates from the reaction mixture. The by-products are removed from the crude products by means of extraction with chloroform or by using other solvents such as acetone, benzene, dichloromethane, dichloroethane, ethyl acetate etc. The products may also be purified by recrystallization.

According to a further feature of the present invention there are provided pharmaceutical compositions containing as active ingredient at least one compound of the Formula I or a salt or quaternary salt thereof in admixture with pharmaceutically acceptable carriers or diluents.

Said pharmaceutical compositions may be administered orally, parenterally or rectally. Thus said pharmaceutical compositions may be in the form of tablets, coated pills, capsules, powders, suppositories, solutions, emulsions, suspensions, or injectable aqueous or oily solutions.

Suitable tablets may be formulated by admixture of the active ingredients with known pharmaceutical excipients, for example inert diluents such as calcium carbonate, lactose, calcium phosphate etc.; disintegrating agents, for example starch or alginic acid; binding agents for example gelatine or acacia mucilage; and lubricating agents for example stearic acid and talc. The tablets may be optionally coated by known methods in order to delay disintegration in the stomach and thus to provide a sustained action over an extended period.

The aqueous suspensions and emulsions generally contain a sweetening agent (for example glycerine, dextrose, or sucrose) and a flavouring agent (e.g. vaniline). The aqueous suspensions may also contain suitable suspending or thickening agents (e.g. sodium carboxymethylcellulose) wetting agents (for example condensation products of fatty alcohols with ethylene oxide) and preservatives, (for example methyl-, or propyl-p-hydroxy-benzoate).

The injectable aqueous suspensions may contain a suspending or thickening agent (e.g. sodium carboxymethyl-cellulose) and wetting or dispersing agents (for example a phenol polyethylene oxide condensate). The sterile injectable preparations may contain preservatives, such as methyl- or n-propyl-p-hydroxy-benzoate.

The compounds of the Formula I possess favourable therapeutical properties, thus they exhibit among others major and minor analgetic, antipyretic and narcosis potentiating effect. Particularly suitable representatives of the compounds of the Formula I are the 3-carbethoxy-4-oxo-6-methyl-4H-pyrido[1,2a]-pyrimidine and the 3-carbethoxy - 4 - oxo - 6 - methyl-6,7,8,9-tetrahydro-4H-pyrido

[1,2a]-pyrimidine (referred to further on as "Compound A") and salts and quaternary salts thereof.

The compounds of the Formula I exhibit also synergetic effect.

3 - carbethoxy - 4-oxo-6-methyl-6,7,8,9-tetrahydro-4H-pyrido[1,2a]-pyrimidine (or its hydrochloric acid salt, to be called in the following "Compound A") is a but slightly toxic compound, which is easily resorbed and has major and minor analgetic and antipyretic action. In very high doses of 500 mg. per kg. of body weight the compound acts as a major analgetic. This dose however is nearly half of the intravenous $LD_{50}$ and therefore the effect can have no practical application in human therapy.

It is further known that the various thiobarbiturate preparations for anaesthesiological purposes with intravenous application can be administered without danger only for the introduction of narcosis, that is to say to produce a short, not more than 30 minutes long narcosis during which time only very short surgical interventions or instrumental tests can be performed.

The major analgetics are morphine or morphine like compounds which are in principle suitable for the complete elimination of the sensation of pain, but in surgical anaesthesiology this property cannot be exploited, as considerably smaller doses of the drug than would be needed for the complete elimination of pain sensation cause a fatal depression of respiration.

Neuroleptic analgesia and gas narcoses of different types which have been recently applied and can be qualified as harmless require an adequately trained team and mechanical respiration apparatus usually available only in some of the surgical departments, and are nowhere to be found in sufficient numbers when the necessity for the treatment of mass injuries arises.

We have come in the course of our experiments to the surprising finding that intravenously administered "Compound A" potentiates to such a degree that usual doses of thiobarbiturates and the not too high doses of morphine and morphine like compounds that thereby an anaesthesis i.e. analgesia of sufficient depth and sufficient duration for the performance of major surgical interventions is produced, while at the same time intravenous "Compound A" antagonizes the depressing action of the above compounds on respiration making intubation and mechanical respiration superfluous.

In detail:

A test which we wish to call the algolytic test was developed by us for the production of surgical pain in animal experiments, i.e. for the study of major analgetic action on rat.

Analgetic action can be satisfactorily studied by measuring the latency period of some preventive reflex, these methods are however nonspecific with respect to analgetic influences, as in these tests every central nervous system depressant and even stimulant compound will be effective. It is therefore methodically expedient to examine some "pathologic" pain which can be prevented only by true analgetics. Accordingly the following procedure was applied to rats. The animal was ligated, a 4 cm. long incision was made on its abdomen through which laparotomy was performed and the operation was evaluated from the aspects of painfulness, tension and post-operational debility. We attempted quantitative measurements and therefore the following units were introduced in the evaluations:

SENSATION OF PAIN

Units:
20—Very strong.
Tries to move violently all the time, cries vehemently.
15—Strong.
Tries to move violently intermittently, cries all the time.
10—Mild.
Occasional weak movement, cries some times on strong stimulation.
5—Very mild.
Does not move, cries occasionally on strong stimulation.
0—None.
Neither moves nor cries (measured in five stages of the operation the maximum for one animal is thus 100).

TENSION

Units:
100—Very strong.
After incision actively presses its intestines outwards, strains during the entire operation, is hard to sew up.
75—Strong.
After incision repeatedly presses its intestines outwards, is difficult to sew up.
50—Mild.
Presses its intestines occasionally outwards, but is easy to operate.
25—Very mild.
Actively, but mildly strains its intestines once or twice during the operation, but can be perfectly operated on.
0—None.
Presses on no occasion its intestines outwards, can be perfectly operated on.

POSTOPERATIONAL DEBILITY

Units:
100—Very strong.
When taken from the operating table remains lying, not even strong stimulation brings it on its feet.
75—Strong.
When taken from the operating table it remains lying or doubled up, gets on four feet when strongly stimulated, but hardly moves.
50—Mild.
Gets on four feet without moving spontaneously, but reacts well to stimulation.
25—Very mild.
Gets on four feet, moves little but spontaneously, reacts well to stimulation.
0—None.
Jumps up immediately after operation, moves spontaneously and vigourously, reacts perfectly to stimulation.

Accordingly working on groups of ten rats the sensation of pain, tension and post-operation debility were determined in units and the average values of each group are given. For maximum pain sensation the value is 100, and in the same way maximum tension and maximum post-operational debility are also both 100.

Higher doses of narcotic analgetics possess a complete analgetic action. This action is manifest in the fact that applied in higher doses they render the rats operable with a minimum signalling of pain sensation or of tension in the animal and produce finally a highly characteristic absence of debility after operation. In the case of maximum effectiveness all three values are 0.

With the algolytic test only the effect of major (morphine type) analgetics can be demonstrated, in this test even subtoxic doses of the usual minor analgetics are ineffective.

The morphine potentiating action of "Compound A" as measured by the algolytic test is demonstrated on hand of the following table:

| "Compound A," mg./kg., i.v. | Morphine, mg./kg., i.v. | Time interval between administration of the compounded preparation and operation, minutes | Pain | Tension | Debility |
|---|---|---|---|---|---|
| 300 | | 20 | 84 | 87 | 0 |
| 500 | | 20 | 70 | 40 | 0 |
| | 5 | 20 | 50 | 72.5 | 0 |
| 100 | 5 | 20 | 50 | 15 | 0 |
| 200 | 5 | 20 | 20 | 0 | 0 |
| 300 | 5 | 20 | 6 | 0 | 0 |

The data in the table indicate that in themselves ineffective doses of "Compound A" and morphine display a full effect when administered in combination.

The potentiating action of "Compound A" on intravenously administered thiobarbiturate compounds, such as Intranarcon and Venobarbital, was also studied on rats.

| Dose, mg./kg. | "Compound A," i.v., time of pretreatment | Intranarcon dose, mg./kg., i.v. | Duration of narcosis, sec. | Prolonged by— percent |
|---|---|---|---|---|
| | | 50 | 546 | 0 |
| 75 | 30 | 50 | 1,992 | +265 |
| 75 | 60 | 50 | 1,368 | +150 |
| 75 | 180 | 50 | 1,198 | +119 |
| 150 | 30 | 50 | 2,956 | +441 |
| 150 | 180 | 50 | 1,099 | +101 |
| 150 | 60 | 50 | 1,532 | +181 |
| 300 | 30 | 50 | 2,965 | +557 |
| 300 | | 50 | 451 | 0 |
| 300 | 180 | 50 | 1,405 | +212 |
| 300 | 60 | 50 | 2,591 | +474 |
| 500 | 30 | 50 | 3,459 | +667 |
| 500 | 60 | 50 | 2,842 | +530 |
| 500 | 180 | 50 | 2,244 | +398 |

The data in the table demonstrate the significant narcosis potentiating action of "Compound A" in doses not higher than one-tenth of $LD_{50}$. In the case of Venobarbital this potentiating action is already significant with doses of 50 mg./kg., that is to say with 1/17th doses of $LD_{50}$, as these doses prolong the duration of Venobarbital narcosis by about 25% on rat. Both Intranarcon and Venobarbital narcoses potentiated with "Compound A" can still be antagonized with Redimyl. On the basis of the aforesaid the narcosis potentiating action of "Compound A" was subjected to investigation when administered simultaneously with Venobarbital and morphine to rats and monkeys.

| "Compound A" dose, mg./kg., i.v. | Venobarbital dose, mg./kg., i.v. | Morphine dose, mg./kg., i.v. | Duration of narcosis, sec. | Prolonged by— percent |
|---|---|---|---|---|
| | 35 | | 419 | |
| 200 | | 2.5 | | |
| 100 | 35 | | 1,537 | 224 |
| 200 | 35 | | 2,029 | 384 |
| | 35 | 0.62 | 1,510 | 260 |
| | 35 | 1.25 | 2,244 | 435 |
| | 35 | 2.5 | 1,966 | 369 |
| 100 | 35 | 0.62 | 3,622 | 764 |
| 100 | 35 | 1.25 | 7,521 | 1,694 |
| 200 | 35 | 0.62 | 6,046 | 1,341 |
| 200 | 35 | 2.5 | 7,912 | 1,788 |

The potentiating action of "Compound A" on Venobarbital narcosis in the presence of morphine in monkeys (Rhesus macacus).

| No. of experimentary animals | "Compound A" dose, mg./kg., i.v. | Venobarbital dose, mg./kg., i.v. | Morphine dose, mg./kg., i.v. | Duration of narcosis, sec. | Prolonged by— percent |
|---|---|---|---|---|---|
| 3 | | 20 | | 660 | |
| 3 | | 20 | 1 | 1,320 | 100 |
| 4 | 200 | 20 | | 1,820 | 173 |
| 4 | 200 | 20 | 1 | 4,680 | 609 |

During the period of narcosis the monkeys were successfully splenectomized.

Series of operations on dogs showed that 0.035 g. per kg. of body weight of intravenously administered Venobarbital induced sleep of 30 to 50 minutes duration, 0.03 g. of Venobarbital plus 2.5 mg. per kg. of body weight of intravenous morphine 250 minutes sleep which latter could not however be exploited as 53% because the experimental animals died within this time. The same doses of Venobarbital and morphine plus 120 mg. per kg. of body weight of intravenous "Compound A" resulted in sleep lasting between 500 and 600 minutes during which the circulation and spontaneous breathing of the animals were satisfactory without the application of mechanical respiration and the operations could be performed. The blood pressure of the animals anaesthetized and operated in the above described manner was measured in the bloody way; no measurable fluctuations in tension were observed neither were any pathologic deviations from normal found in the course of the urine function tests. Histological examinations showed no pathological lesions indicative of damages caused by drugs. With respect to the drug safety of the above described anaesthesiological method ten animals were subjected to trials lasting 16 days; in these trials the dogs were anaesthetized daily for 16 days by the above described method and with the above doses. After waking there was no change in the behaviour of the animals, they had not forgotten the reflexes known before and developed no observable pathologic symptoms in the following two weeks of observation.

The potentiating action of "Compound A" was studied also on other morphine like compounds. For this purpose we selected thalamonal, a drug used in neuroleptic analgesia II which contains in 50:1 ratio dehydro-benzperydol and phentanyl. The experiments were carried out on dogs; in the period of preparation the animals were given intramuscularly 0.02 ml. per kg. of thalamonal followed after 30 minutes, in the period of narcosis, by 0.1 ml. per kg. of the same drug administered intravenously. The dogs in the other group received in addition to the same thalamonal dose 120 mg./kg. of "Compound A" intravenously. No sleep was observed on dogs who received thalamonal only, these animals displayed but strong stupor for 25 to 35 minutes, registration of pain was maintained to a greater or lesser degree in each animal. In dogs treated with additional "Compound A" medium deep sleep lasting for 10 to 15 minutes and complete insensitivity for 15 to 20 minutes were observed.

When we examined in the course of our pharmacological investigations "Compound A" in combination with some other compounds we observed such surprising and unexpected toxicological antagonism or pharmacological synergism between the compounds which may provide extensive justification for the manufacture of compounded drug specialties, namely:

A toxicological antagonism appears between "Compound A" and Amidazophen which is the more pronounced the greater the relative "Compound A" content of the compounded drug.

| Composition of the compounded drug (in percent of the components) | | $LD^{50}$ expected in case of addition, mg./kg. | Experimentally obtained, $LD_{50}$ mg./kg. |
|---|---|---|---|
| "Compound A" | Amidazophen | | |
| 100 | | | 2,200 |
| | 100 | | 600 |
| 87.5 | 12.5 | 2,000 | 2,500 |
| 75 | 25 | 1,800 | 2,700 |
| 50 | 50 | 1,400 | 1,900 |
| 25 | 75 | 1,000 | 1,200 |

The combined antipyretic action of "Compound A" and Amidazophen was tested on rabbits in the usual manner. Fever was produced by the intravenous administration of a standard coli suspension and the compounds under investigation were administered orally one hour later. The antipyretic action was expressed in percentage in such a way that the body temperature prior to the administration of the coli was taken as 0%, the feverous temperature one hour after the administration of the coli as 100% and the antipyretic effect was determined as a function of time.

The observed and measured combined effects were plotted in the right angle coordinate system in the form of an isobola. It appeared quite clearly that all the combinative points are towards the origin from the straight line which would represent addition, thus testify to potentiating synergism.

Th analgetic action of Amidazophen plus "Compound A" was examined by the peritoneal test on mice. The method originally described by van der Wende for rats (Fed. Proc., 15, 494, 1956) was used by us in the form modified by Wilkins et al. (J. Pharmacol., 133, 400, 1961) and Koster and Anderson (Fed. Proc. 22, 248, 1963) for mice.

The analgetic actions of "Compound A" and ethyl-morphine were investigated by the skin convulsion method on guinea-pigs (the method was described by Winder, Pfeiffer and Maison in the Arch. Int. Pharmacody., 72, 329, 1946). The method consists in focusing the beam of a standard light source on the skin on the back of the guinea-pig from where the hair had been removed. To point-like thermal stimulations the animals respond with characteristic convulsions of their skin. The experimental results verified the potentiating synergism between the analgetic actions of "Compound A" and ethyl-morphine.

The analgetic action of a combination of "Compound A" base and Algopyrin was investigated on rabbit by the tooth pulp stimulation test. We modified the method described by Credner and Ehrenbrecht (Arzneimittel-forschung, 7, 550, 1957) in so far that we produced with the help of an appropriate stimulation source constant current pulses so that the intensity of the current passing through the pulp tissue was independent of the resistance of the tissue, i.e. of the tissue-electrode contact. After the determination of the control stimulation threshold the compounds under investigation were administered intravenously and 10, 20 and 30 minutes after their administration the stimulation threshold was again determined. The effect was expressed in the percentage increase of the central stimulation threshold. Additive synergism was demonstrated between the analgestic actions of "Compound A" and Algoxyrin.

Measured by the algolytic test intravenously injected "Compound A" potentiates the algolytic effect of orally administered morphine and a similar synergism of potentiating character was observed when both drugs were applied orally.

Further experiments furnished the surprising result that the "Compound A" in addition to potentiating the effect of morphine will delay on simultaneous administration with the latter morphine habituation, moreover will restore morphine sensitivity in animals already habituated to morphine. Doses of "Compound A" which alone are either ineffective or display only a mild effect will restore to a considerable degree the morphine sensitivity of morphine habituated rats and when administered together with 10 mg. per kg. of morphine will have a much stronger effect than 20 mg. per kg. of morphine alone.

Thus the pharmaceutical compositions may also contain further therapeutically active substances such as major and minor analgesics, sedatives, anaesthetics, antipyretics, spasmolytics, hypnotics, muscle relaxants, minor and major tranquillants. The pharmaceutical compositions may particularly comprise as additional therapeutically active ingredients morphine, ethyl-morphine, Veno-barbital, caffeine, codeine, Algopyrin, Amidazophen, Somben, No-Spa, Isopropamid, Acizal, Motolon, Sevenal, methyl-homatropinium-bromide, Dionine, Intranarcon, methyl-morphine, etc. Further details of our process are to be found in the examples. The examples will however only illustrate the invention without limiting it thereto.

EXAMPLE 1

139.2 g. of $\alpha,\alpha'$-picolyl-amine-methylene-malonic acid-diethylester (M.P. 113–114° C.), 230 g. of phosphorous oxychloride and 35 g. (0.35 mole) of polyphosphoric acid are refluxed for 3 hours under stirring. At 30–40° C. 500 ml. of anhydrous ethanol are slowly added. The reaction mixture gets warm. The mixture is then cooled to room temperature under stirring and allowed to stand overnight in a refrigerator. The precipitated crystals are filtered by suction, washed with anhydrous ethanol and dried. Thus 130 g. of 3-carbethoxy-4-oxo-6-methyl-4H-pyridol[1,2$\alpha$]pyrimidine-hydrochloride are obtained in the form of faint yellow crystals. M.P.: 218–220° C. The product may be purified by extraction with 300 ml. of chloroform, whereby 120 g. of the purified white product melting at 223–224° C. are obtained. Yield: 89.5%.

The product is water-soluble and a 25% aqueous solution thereof may be prepared. It is slightly soluble (1–2%) in ethanol, methanol, chloroform, butanol, acetic acid and dimethylformamide. The product is insoluble in acetone, dichloromethane, dichloroethane, ethyl acetate and benzene.

Analysis (percent): C, 53.65; H, 4.83; N, 10.54; Cl, 13.34. Calculated (percent): C, 53.64; H, 4.87; N, 10.42; Cl, 13.19.

The free base may be converted into the salicylate by reacting same with salicylic acid in ethanol. M.P.: 83–85° C.

The pharmacological tests carried out with the product prepared according to this example are summarized below:

3-carbethoxy-4-oxo-6-methyl-4H-pyrido[1,2$a$] - pyrimidine-hydrochloride $LD_{50}$ on mice 265 mg./kg. i.v. The product exhibits narcosis-potentiating effect; it lengthens the narcosis time of a 50 mg./kg. i.v. dose of Intranarcon by 797% on rats if administered in a dose of 250 mg./kg.-bodyweight. In a dose almost reaching the toxic amount the product possesses a pronounced analgetic effect. The product also shows a moderated spasmolytic effect.

3-carbethoxy-4-oxo-6-methyl-4H-pyrido[1,2$a$] - pyrimidine-base $LD_{50}$ on mice is 260 mg./kg. i.v. and 850 mg./kg. s.c. The product exhibits an expressed narcosis-potentiating effect. If administered in an intravenous dose of 200 mg./kg. it lengthens the narcosis-time of a 50 mg./kg. dose of Intranarcon on rats by 479%. If administered intravenously in a dose of 150 mg./kg. it provides a very short narcosis on rats (74 seconds).

3 - carbethoxy-4-oxo-6-methyl-4H-pyrido[1,2a]-pyrimidine-methoiodide. The $LD_{50}$-value on rats is 125 mg./kg. i.v. and 2750 mg./kg. orally. The product potentiates the Intranarcon-narcosis only in a slight extent. If administered in a dose of 10–30 mg./kg. it causes a hypotony of 20–60 Hg mm. for a short period of time and this effect can not be antagonized with Atropin, antihistamine and $\beta$-receptor-blocking agents.

3 - carbethoxy-4-oxo-6-methyl-4H-pyrido[1,2a]-pyrimidine-methonitrate. The $LD_{50}$-value on rats amounts to 100 mg./kg. i.e. and 350 mg./kg. s.c. The product exhibits a weak narcosis-potentiating effect and it possesses ganglion-blocking activity.

EXAMPLE 2

54.1 g. of 2-amino-6-methyl-pyridine 108.1 g. of ethoxymethylene-malonic acid ester ($n_D^{20}$=1.4580–1462), 306.7 g. of phosphorous oxychloride, and 35 g. of polyphosphoric acid are refluxed for 3 hours. The reaction mixture is worked up as described in Example 1. Thus 3-carbethoxy- 4-oxo-6-methyl - 4H - pyrido[1,2a]-pyrimidine-hydrochloride is obtained.

268.7 g. of 3-carbethoxy-4-oxo-6-methyl - 4H - pyrido[1,2a]-pyrimidine-hydrochloride are dissolved in 2000 ml. of water, whereupon the pH of the solution is adjusted to 9 by adding a 10% sodium carbonate solution. The product precipitates in the form of glossy crystals, which are filtered, washed with water and dried. Thus 220 g. of the free base are obtained; the melting point varies between 55 and 85° C. depending on the water content and amounts generally to 61–62° C. On drying over phosphorous pentoxide the base melts at 94–95° C. On recrystallizing the product melting at 61–62° C. from anhydrous ethanol, a 3-carbethoxy - 4 - oxo - 6 - methyl-4H-pyrido[1,2a]-pyrimidine melting at 94–95° C. is obtained.

Analysis (percent): C, 62.06; H, 5.12; N, 12.10. Calculated (percent): C, 62.10; H, 5.17; N, 12.06.

In place of sodium carbonate also sodium hydroxide, potassium hydroxide or sodium hydrogen carbonate may be used for setting the base free.

26.9 g. of 3-carbethoxy-4-oxo-6-methyl - 4H - pyrido[1,2a]pyrimidine-hydrochloride are heated with 19.6 g. of concentrated sulfuric acid in 300 ml. of anhydrous ethanol for 5 minutes. The precipitated product is filtered when cold and washed with anhydrous ethanol. Thus 30 g. of 3-carbethoxy-4-oxo-6-methyl-homopyrimidazole-sulfate are obtained. M.P.: 182–185° C. On recrystallization from anhydrous ethanol 28 g. of a snow-white product are obtained. The product melts at 185–186° C. and is water soluble.

The 3-carbethoxy-4-oxo-6-methyl-4H-pyrido[1,2a]-pyrimidine reacted at room-temperature with methyl iodide, methyl bromide and dimethyl sulphate respectively. The reaction mixture is allowed to stand in the dark, the precipitated crystals are filtered off. Thus the following products are obtained: 1,6-dimethyl-3-carbethoxy-4-oxo-4H-pyrido[1,2a]pyrimidine-iodide. Yellow crystals. M.P.: 236–237° C.

Analysis (percent): C, 41.2; H, 3.8; N, 7.6; J, 33.2. Calculated (percent): C, 41.72; H, 4.04; N, 7.48; J, 33.91.

1,6-dimethyl - 3 - carbethoxy-4-oxo-4H-pyrido[1,2a]pyrimidine-bromide. M.P.: 203–204° C.

Analysis (percent): Br, 24.17; (calcd.: 24.45).

1,6-dimethyl - 3 - carbethoxy-4-oxo-4H-pyrido[1,2a]pyrimidine-methyl-sulfate. M.P.: 178–180° C. The product is water soluble.

Analysis (percent): C, 8.76 (calcd.: 8.92).

An aqueous solution of 17.0 g. of silver nitrate is added to 37.4 g. of 1,6-dimethyl-3-carbethoxy-4-oxo-4H-pyrido[1,2a]pyrimidine iodide. The precipitate is filtered off, the solution is evaporated to dryness and the residue is recrystallised from ethanol. Thus 14 g. of 1,6-dimethyl-3-carbethoxy-4-oxo-4H - pyrido[1,2a]pyrimidine-nitrate are obtained in the form of water soluble needle crystals.

Analysis (percent): N, 13.71; (calcd.: 13.59).

EXAMPLE 3

26.9 g. of 3-carbethoxy-4-oxo-6-methyl-homopyrimidazole-hydrochloride are hydrogenated in 150 ml. of anhydrous ethanol as medium in the presence of 7.0 g. of a palladium-charcoal catalyst (containing about 10% of palladium) and 1 ml. of 25% hydrochloric acid. At room temperature 2 moles of hydrogen are taken up, whereafter the reaction mixture is filtered and the filtrate is evaporated to dryness in vacuo. Thus 27.8 g. of crude 3-carbethoxy - 4 - oxo-6-methyl-6,7,8,9-tetrahydro-4H-pyrido[1,2a]pyrimidine-hydrochloride are obtained in the form of crystals. M.P. 165–170° C. The product is dissolved in 50 ml. of water, the solution is clarified with activated charcoal, made alkaline with a 10% of sodium carbonate solution and extracted with chloroform. The united chloroform solutions are evaporated to dryness in vacuo. The residual oil is dissolved in acetone, whereupon the solution is saturated with dry hydrochloric acid. Next day the precipitated crystals are filtered, washed with acetone and dried. Thus 18 g. of 3-carbethoxy-4-oxo-6-methyl-6,7,8,9-tetrahydro - 4H - pyrido[1,2a]pyrimidine-hydrochloride are obtained in the form of snow-white crystals melting at 171–172° C. The product is soluble in water, ethanol, methanol, chloroform, dichloroethane and dimethylformamide, while it is practically insoluble in benzene, ethyl acetate, toluene and petrol.

Analysis (percent): Cl, 12.64; C, 53.06; H, 6.54; N, 10.30. Calcd. (percent): Cl, 13.0; C, 52.80; H, 6.28; N, 10.27.

The free 3-carbethoxy-4-oxo-6-methyl-6,7,8,9-tetrahydro-4H-pyrido[1,2a]pyrimidine base is set free by adding sodium carbonate to the aqueous solution of the above salt. The melting point of the free base was found to be 60–61° C. and on recrystallization from ethylacetate it amounts to 62–63° C. The product is excellently soluble in ethanol, water, methanol, acetone, benzene, chloroform, carbon tetrahydrochloride, dimethylformamide, ethyl acetate, dichloro ethane and dichloro methane.

Analysis (percent): C, 60.94; H, 6.82; N, 11.85. Calcd. (percent): C, 60.71; H, 7.04; N, 12.04.

On heating the free base with methyl iodide 1,6-dimethyl-3-carbethoxy-4-oxo-6,7,8,9 - tetrahydro-4H-pyrido[1,2a]pyrimidine-iodide is obtained in the form of greenish-yellow crystals. M.P.: 205–206° C.

Analysis (percent): J, 32.90 (calcd: 33.55).

3-carbethoxy-4-oxo-6-methyl-6,7,8,9-tetrahydro-4H-pyrido[1,2a]pyrimidine and its hydrochloride The $LD_{50}$ value of the hydrochloride on rats amounts to 860 mg./kg. i.v., 2100 mg./kg. s.c. and 2200 mg./kg. if administered orally. The $LD_{50}$ value of the free base on mice is 810 mg./kg. i.v., 1750 mg./kg. s.c. and 1700 mg./kg. if administered orally. The pharmacological properties of the free base and the hydrochloride are identical. Both compounds are excellently absorbed when administered orally and they exhibit strong antipyretic effect. Tested on various specii by usual pharmacological methods they exhibit "minor analgetic" effect. The analgetic effect of the product is of the same order as that of generally used analgetics (Amidazophen, Phenacetin).

The products exert an extremely strong narcosis-potentiating effect, moreover they strongly potentiate the analgetic activity of morphine and derivatives thereof. At the same time they also antagonize the respiration-depressive effect of acid compounds.

The products exhibit a mild sedative and a weak spasmolytic effect. They do not influence the normal and the increased basal metabolism in a considerable extent. The compounds do not possess any major tranquillant, antidepressive, psychomymetic, muscle-relaxant, cholinerg-stimulant, adrenerg-stimulant, hystamine-like adrenolytic, adrenerg-neuron-blocking and gnanglion-blocking effect.

The products do not damage the heart even in large doses. They potentiate the effect of major tranquillants.

Sodium-3-carbethoxy-4-oxo-6-methyl-6,7,8,9-tetrahydro-4H-pyrido[1,2a]pyrimidine

The $LD_{50}$ value of the product is 2000 mg./kg. i.e. and 5000 mg./kg. if administered orally on rats. The product lengthens the narcosis-time of Intranarcon by 200% if administered intravenously in a dose of 200 mg./kg. On narcotized animals it causes a temporary increase of the blood pressure if administered in a dose of 100–500 mg./kg.

EXAMPLE 4

23.6 g. of 3-carbethoxy-4-oxo-6-methyl-6,7,8,9-tetrahydro-4H-pyrido[1,2a]pyrimidine are dissolved in 200 ml. of water, whereupon at room temperature a mixture of 1.9 g. of sodium borohydride and 10 ml. of water is added under stirring within an hour. The temperature rises spontaneously to 36° C. After an hour the precipitated crystals are filtered, washed with water and dried. Thus 20.5 g. of 4-ethoxy-6-methyl-6,7,8,9-tetrahydro-4H-pyrido[1,2a]pyrimidine-3-carboxylate are obtained. M.P. 200–201°

C. Yield: 86%. After recrystallization the product melts at 205–206° C.

Analysis (percent): C, 60.42; H, 7.61; N, 11.94. Calcd. (percent): C, 60.50; H, 7.56; N, 11.76.

EXAMPLE 5

26.4 g. of α-pyridylamino-methylene-malonic acid-diethyl-ester, 46.0 g. of phosphorous oxychloride and 5 g. of polyphosphoric acid are reacted as described in Example 1. Thus 25.5 g. of 3-carbethoxy-4-oxo-4H-pyrido[1,2a]pyrimidine-hydrochloride are obtained. M.P., 205–210° C. The crude product is stirred with 10 ml. of chloroform for 10 minutes at room temperature, filtered and dried. Thus 22.5 g. of the purified salt are obtained. M.P.: 220–221° C. The product is water soluble. The free base is prepared by dissolving the above salt in water and adding sodium carbonate. The 3-carbethoxy-4-oxo-4H-pyrido[1,2a]pyrimidine melts at 111–112° C. (after crystallization from ethanol).

EXAMPLE 6

108.2 g. of 2-amino-6-methyl-pyridine, 130.1 g. of acetoacetic ester, 613.4 g. of phosphorous oxychloride and 70 g. of phosphoric acid are reacted as described in Example 1. Thus 140 g. of a faint pink product are obtained which is recrystallized from ethanol and washed with chloroform. Thus 105 g. of 2,6-dimethyl-4-oxo-4H-pyrido[1,2a]pyrimidine-hydrochloride are obtained. M.P.: 298–300° C. The product is soluble in water (6%). The product is slightly soluble in methanol and ethanol and practically insoluble in acetone, ethyl acetate, benzene, chloroform and carbon tetrachloride.

Analysis (percent): C, 57.53; H, 5.51; N, 13.54; Cl, 16.80. Calcd. (percent: C, 56.87; H, 5.26; N, 13.27; Cl, 16.82.

The 2,6-dimethyl-4-oxo-4H-pyrido[1,2a]pyrimidine is set free from the above salt in aqueous solution with sodium carbonate. M.P.: 106–107° C. After recrystallization from acetone a snow-white crystalline product melting at 108–109° C. is obtained.

Analysis (percent): N, 15.80 (calcd. 16.08).

EXAMPLE 7

23.6 g. of 3-carbethoxy-4-oxo-6-methyl-6,7,8,9-tetrahydro-4H-pyrido[1,2a]pyrimidine are allowed to stand in 100 ml. of concentrated ammonium hydroxide for about 24 hours. The precipitated crystals are filtered off, washed with water and dried. Thus 19.0 g. of a crude product are obtained. M.P.: 196–198° C. After recrystallization from methanol 15.0 g. of 4-oxo-6-methyl-6,7,8,9-tetrahydro-4H-pyrido[1,2a]pyrimidine-3-carboxylic acid-amide are obtained, which melts at 198° C. The 4-oxo-6-methyl-6,7,8,9-tetrahydro-4H - pyrido[1,2a]pyrimidine-3-carboxylic acid-amide-hydrochloride is prepared from the base by adding hydrochloric acid in methanol as medium. M.P.: 235–236° C.

Analysis (percent): N, 17.04 (calcd.: 17.23).

EXAMPLE 8

63.2 g. of 2,6-dimethyl-4-oxo-4H-pyrido[1,2a]pyrimidine-hydrochloride are hydrogenated in 350 ml. chloroform in the presence of 20 g. of palladium-charcoal and 2 ml. of ethanol containing hydrochloric acid at room temperature and at atmospheric pressure or at a pressure of 2–10 atm. After the absorption of 2 moles of hydrogen the catalyst is filtered off, washed three times with 50 ml. of warm ethanol each and the filtrate is evaporated to dryness. Thus 65 g. of crude 2,6-dimethyl-4-oxo-6,7,8,9-tetrahydro-4H-pyrido[1,2a]pyrimidine-hydrochloride are obtained. M.P.: 285–288° C. The product is purified by recrystallization from 70% aqueous ethanol. M.P.: 289–290° C.

Analysis (percent): C, 55.88; H, 7.60; N, 12.95. Calcd. (percent): C, 56.00; H, 6.52; N, 13.04.

EXAMPLE 9

23.06 g. of 3-carbethoxy-4-oxo-6-methyl-6,7,8,9-tetrahydro-4H-pyrido[1,2a]pyrimidine are stirred in a solution of 6.0 g. of sodium hydroxide and 100 ml. of water for 4 hours. The reaction mixture is acidified with hydrochloric acid to pH 2–3, whereupon the precipitated crystals are filtered and dried. Thus 35.5 g. of 3-carboxy-4-oxo-6-methyl-6,7,8,9-tetrahydro-4H-pyrido[1,2a]pyrimidine are obtained. The product is easily soluble in most solvents. The melting point of the sodium salt amounts to 245° C.

Analysis (percent): N, 13.25; (calcd.: 13.45).

EXAMPLE 10

11.4 g. of sodium borohydride are dissolved in 350 ml. of water at 15–20° C. whereupon 41.4 g. of 4-oxo-6-methyl-6,7,8,9-tetrahydro - 4H - pyridol[1,2a]pyrimidine-3-carboxylic acid amide are added under stirring. A clear solution is obtained, in which soon a precipitate appears. After 2 hours of stirring the precipitate is filtered by suction, washed with water and dried. Thus 34.0 g. of 4-hydroxy-6-methyl - 6,7,8,9 - tetrahydro-4H-pyrido[1,2a]pyrimidine-3-carboxylic acid amide are obtained. M.P.: 225–227° C. After recrystallization from anhydrous ethanol the melting point amounts to 228–229° C.

Analysis (percent): C, 57.12; H, 7.63; N, 19.94. Calc. (percent): C, 57.38; H, 7.74; N, 20.07.

The hydrochloride is obtained by reacting the free base with hydrochloric acid in ethanol as medium. M.P.: 220–221° C.

EXAMPLE 11

6.0 g. of sodium hydroxide are dissolved in 150 ml. of water, whereupon 23.2 g. of 3-carbethoxy-4-oxo-6-methyl-4H-pyrido[1,2a]pyrimidine are added. The reaction mixture is stirred at room-temperature for 2 hours whereupon it is acidified with a 10% hydrochloric acid to a pH value of 3–4. The precipitated crystalline product is filtered, washed with water and dried. M.P.: 180–181° C.

The crude product thus obtained is taken up in a sodium hydrogen carbonate solution, clarified with activated charcoal and precipitated with hydrochloric acid. Thus 15.0 g. of 3-carboxy-4-oxo-6-methyl-4H-pyrido[1,2a]pyrimidine are obtained. M.P.: 190–191° C.

Analysis (percent): C, 58.60; H, 4.00; N, 13.62. Calc. (percent): C, 58.62; H, 3.95; N, 13.72.

EXAMPLE 12

125.1 g. of α,α'-picolyl-amino-methylene-malonic acid dimethyl ester (96–97° C.), 230 g. of phosphorous oxychloride, 15 g. of polyphosphoric acid and 200 ml. of benzene are refluxed for 3 hours under stirring. The reaction mixture is worked up as described in Example 1. Thus 100 g. of 3-carbomethoxy-4-oxo-6-methyl-4H-pyrido[1,2a]pyrimidine-hydrochloride are obtained. M.P.: 190–191° C. The product thus obtained is suspended in 200 ml. of chloroform, the mixture is stirred for about 30 minutes, filtered by suction and dried. Thus 95 g. of the purified product are obtained. M.P.: 195–196° C.

Analysis (percent): C, 51.64; H, 3.81; N, 10.7; Cl, 13.76. Calc. (percent): C, 51.80; H, 3.95; N, 11.0; Cl, 13.90.

EXAMPLE 13

20.8 g. of 3-carboxy-4-oxo-6-methyl-6,7,8,9-tetrahydro-4H-pyrido[1,2a]pyrimidine are melted and kept at 140–150° C. for residual brown oil is distilled off in vacuo. At 145–150° C./2 Hg mm., a colourless oil distills off which sets quickly solid to yield a white crystalline slurry. Thus 4-oxo-6-methyl-6,7,8,9 - tetrahydro-4H-pyrido[1,2a]pyrimidine is obtained with a yield of 80.5%. M.P.: 58–60° C.

Analysis (percent): C, 65.81; H, 7.10; N, 16.87. Calc. (percent): C, 65.91; H, 7.37; N, 17.08.

16.4 g. of the product thus obtained are dissolved in 40 ml. of anhydrous ethanol and dry hydrochloric acid is introduced. The precipitated crystalline salt is filtered by suction. Thus 17.0 g. of 4-oxo-6-methyl-6,7,8,9-tetrahydro-4H-pyrido[1,2a]pyrimidine-hydrochloride are obtained. M.P.: 206–207° C.

EXAMPLE 14

32.84 g. of 4-oxo - 6 - methyl-6,7,8,9-tetrahydro - 4H-pyrido[1,2a]pyrimidine are hydrogenated in 200 ml. of anhydrous ethanol and 20 ml. of hydrochloric acid in the presence of 10 g. of a palladium-charcoal catalyst (palladium content about 8%) at 5–10 atm. and 30–35° C. for 4 hours. The reaction mixture is filtered and the filtrate is evaporated to dryness in vacuo. The yellowish honeylike residue is dissolved in 50 ml. of water and the pH is adjusted with a 20% sodium carbonate solution to 9. The solution is extracted twice with 100 ml. of chloroform each, whereupon the united chloroform solutions are dried over sodium sulfate and evaporated to dryness in vacuo. The residual brown oil is fractionated in vacuo at 1.5 Hg mm. Thus 24.6 g. of 4-hydroxy-6-methyl-6,7,8,9-tetrahydro-homopyrinidazole are obtained. M.P.: 135–140° C./1.5 Hg mm.

Analysis (percent): C, 65.00; H, 8.40; N, 16.94. Calc. (percent): C, 65.12; H, 8.50; N, 16.88.

On reaction the free base with hydrochloric acid in anhydrous ethanol 4-hydroxy-6-methyl-6,7,8,9-tetrahydropyrimidazole-hydrochloride is obtained in the form of snow-white crystals.

EXAMPLE 15

16.4 g. of 4-oxo-6-methyl-6,7,8,9-tetrahydro-homo-4H-pyrido[1,2a]pyrimidine are dissolved in 50 ml. of water whereupon a solution of 5.68 g. of sodium borohydride and 50 ml. of water is added dropwise at room temperature within 30 minutes under stirring.

The reaction-mixture is stirred for an hour, whereupon the pH is adjusted to a value between 3 and 4 by adding a 10% hydrochloric acid solution. The reaction mixture is then made alkaline to pH=9 by adding a 20% sodium carbonate solution and extracted twice with 100 ml. of chloroform each. The united chloroform solutions are dried, evaporated in vacuo and the residue is fractionated. 140–145° C./2 Hg mm. 12.0 g. of 4-hydroxy-6-methyl-6,7,8,9 - tetrahydro - 4H - pyridol[1,2a]pyrimidine are obtained as main-fraction.

The crystalline 1,6-dimethyl-4-oxo-6,7,8,9-tetrahydro-4H-pyrido[1,2a]pyrimidine-iodide is prepared by reacting the above product with methyl iodide at room temperature, M.P.: 220–222° C.

Analysis (percent): J, 42.2 (calcd.: 42.2).

15.3 g. of the quaternary iodide, thus obtained are dissolved in 50 ml. of water and the pH is adjusted to 9 by adding a 20% sodium carbonate solution. The mixture is extracted twice with 100 ml. of chloroform each and the united chloroform solutions are evaporated to dryness in vacuo. The residue is taken up in 20 ml . of ethanol and saturated with dry hydrogen chloride. Thus 8.5 g. of 1,6 - dimethyl-4-oxo-6,7,8,9-tetrahydro-4H-pyridol[1,2a]pyrimidine - chloride are obtained. M.P.: 212° C.

Analysis (percent): Cl, 16.3 (calcd.: 16.5).

EXAMPLE 16

23.6 g. of 3-carbethoxy-4-oxo-6-methyl-6,7,8,9-tetrahydro-4H-pyrido[1,2a]pyrimidine are dissolved in 25 ml. of water, whereupon 7.6 g. of hydroxylamine-hydrochloride are added. Thereafter a solution of 8.0 g. of sodium hydroxide and 50 ml. of water is added. The faint yellow solution thus obtained is allowed to stand for 24 hours. The reaction mixture is acidified with a 50% acetic acid solution, the precipitated hydroxamic acid is filtered, washed with water and dried. M.P.: 174–175° C. Yield: 78.5%. The product is purified by recrystallization from ethanol. Thus 4-oxo-6-methyl-6,7,8,9-tetrahydro-4H-pyrido[1,2a]pyrimidine-3-hydroxamic acid is obtained in the form of white crystals.

M.P.: 199–200° C.

Analysis (percent): C, 53.63; H, 6.08; N, 18.89; Calcd. (percent): C, 53.81; H, 5.86; N, 18.83.

The free acid can be converted into the water soluble sodium salt.

The following examples are directed to the preparation of pharmaceutical compositions containing compounds of the Formula I as active ingredient. In the examples the 3-carbethoxy - 4 - oxo-6-methyl-6,7,8,9-tetrahydro-4H-pyrido[1,2a]pyrimidine is abbreviated as "Compound A."

EXAMPLE 17

Pharmaceutical preparations having the following composition are prepared.

(A) Ampoules: Pro ampoule
  "Compound A" _____ 500 mg.
  Aqua dest, pro inj. ad 5 ml.
(B) Ampoules
  a salt thereof) _____ 0.02
  "Compound A" _____ 1000 mg.
  Aqua dest. pro inj. ad 5 ml.
(C) Solution: Pro 100 ml.
  "Compound A" _____ 10 g.
  Flavouring ingredient q.s.
  Aqua dest. ad 100 ml.

Said solution is filled in bottles and is suitable for oral administration.

(D) Suppositories: Pro suppository
  "Compound A" or its hydrochloride ____mg__ 100
  Massa supp. ad _____g__ 2
(E) Capsules:
  "Compound A" or its hydrochloride is finished in capsules in doses of 50,100 and 150 mg.
(F) Tablets: Pro tablet, g.
  "Compound A" or its hydrochloride _____ 0.1
  Gelat. alb. _____ 0.001
  Stearine _____ 0.001
  Talc _____ 0.001
  Potato starch _____ 0.007

EXAMPLE 18

The following pharmaceutical compositions suitable for parenteral administration are prepared:

(A)

Ampoule No. 1 contains 0.5 g. of lyophilized Venobarbital
Ampoule No. 2 contains:
  0.11 g. of morphine-hydrochloride
  8.4 g. of "Compound A"
  10.0 ml. of distilled water.

(B)

Ampoule No. 1 contains 0.250 mg. of lyophilized Venobarbital or Inactin.
Ampoule No. 2 contains:
  0.17 g. of morphine hydrochloride or base
  7.0 g. of "Compound A"
  ad 20.0 ml. of aqua bis dest. pro inj.

(C)

Ampoule No. 1 contains:
  0.5 g. of Venobarbital
  0.11 g. of morphine hydrochloride
  8.4 g. of lyophilized "Compound A"
Ampoule No. 2 contains aqua dest. pro inj. q.s. for intravenous injection or infusion.

EXAMPLE 19

Tablets having the following compositions are prepared:

| | Pro tablet, g. |
|---|---|
| Morphine hydrochloride | 0.01 |
| "Compound A" | 0.10 |
| Stearine | 0.0006 |
| Gelat. alb. | 0.0010 |
| Talc | 0.0030 |
| Potato starch | 0.0250 |
| Lactose | 0.0204 |

EXAMPLE 20

Suppositories having the following composition are prepared:

| | Pro suppository, g. |
|---|---|
| Morphine hydrochloride | 0.02 |
| "Compound A" | 0.10 |
| Massa suppl. ad | 2.00 |

EXAMPLE 21

Solutions having the following composition are prepared:

(A)

Morphine hydrochloride—0.1 g.
"Compound A"—1.00 g.
Aqua dest. ad—10.00 ml.

(B)

Ethyl-morphine-hydrochloride—0.4 g.
"Compound A"—4.0 g.
Algopyrin—12.0 g.
Flavouring ingredients q.s.
Aqua dest. ad—200.0 ml.

EXAMPLE 22

Capsules having the following composition are prepared:

(A)

| | Pro capsule, g. |
|---|---|
| Caffeine purum (or the corresponding amount of a salt thereof | 0.02 |
| Codeine or methyl-morphine (the base or a salt thereof) | 0.02 |
| Algopyrin | 0.400 |
| "Compound A" or the hydrochloride thereof | 0.10 |

(B)

| | |
|---|---|
| Amidazophen | 0.27 |
| Somben | 0.18 |
| "Compound A" or its hydrochloride | 0.10 |

(C)

| | |
|---|---|
| No-Spa | 0.06 |
| Isopropamidum | 0.005 |
| Algopyrin | 0.300 |
| "Compound A" or the hydrochloride thereof | 0.100 |

(D)

| | |
|---|---|
| Algopyrin | 0.400 |
| "Compound A" or its hydrochloride | 0.150 |

(E)

| | |
|---|---|
| Algopyrin | 0.300 |
| Acisal | 0.300 |
| "Compound A" or its hydrochloride | 0.100 |

(F)

| | Pro capsule, g. |
|---|---|
| Amidazophen | 0.3 |
| "Compound A" | 0.2 |

(G)

| | |
|---|---|
| Motolon | 0.200 |
| "Compound A" or its hydrochloride | 0.150 |

(H)

| | |
|---|---|
| Several | 0.100 |
| "Compound A" or its hydrochloride | 0.100 |

Example 23

Ampoules having the following composition are prepared:

(A)

| | Pro ampoule, g. |
|---|---|
| No-Spa | 0.06 |
| Methyl-homatropinium-bromide | 0.0015 |
| Dionin | 0.0100 |
| "Compound A" or its hydrochloride | 0.100 |
| Algopyrin | 0.200 |

(B)

| | |
|---|---|
| Venobarbital | 0.500 |
| "Compound A" or its hydrochloride | 0.250 |

What we claim is:
1. A compound of the formula

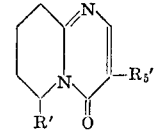

wherein R' is hydrogen or alkyl containing from 1 to 5 carbon atoms; $R_5'$ is —$COOR_{10}$ and $R_{10}$ is hydrogen or alkyl containing from 1 to 5 carbon atoms; pharmaceutically acceptable salts thereof; and pharmacetically acceptable quaternary salts thereof.

2. A compound of claim 1 wherein said compound is 3-carboxy 6 - methyl-6,7,8,9-tetrahydro-4H-pyrido-[1,2a] pyrimidin-4-one.

3. The compound 3-carbethoxy-6-methyl-6,7,8,9-tetrahydro-4H-pyrido-[1,2a] pyrimidin-4-one.

References Cited

UNITED STATES PATENTS 3,149,112  9/1964  Allen _____ 260—256.4

OTHER REFERENCES

Antaki, Chem. Abstracts, 52:20189 (1958).
Lappin, J. Am. Chem. Soc., 70, 3348–50 (1948).

ALEX MAZEL, Primary Examiner

R. J. GALLAGHER, Assistant Examiner

U.S. Cl. X.R.

260—256.4, 295, 296, 484; 414—200, 232, 251